United States Patent [19]
Bianco et al.

[11] Patent Number: 5,465,176
[45] Date of Patent: Nov. 7, 1995

[54] METHOD OF EMBOSSING REPEATING PATTERNS ON A SUBSTRATE, THE PATTERNS HAVING DIFFERENT RATES OF REPETITION

[75] Inventors: James S. Bianco, Enfield, Conn.; David J. Horan, Westfield, Mass.

[73] Assignee: Control Module Inc., Enfield, Conn.

[21] Appl. No.: 282,774

[22] Filed: Jul. 29, 1994

Related U.S. Application Data

[63] Continuation of Ser. No. 962,934, Oct. 19, 1992, abandoned, which is a continuation-in-part of Ser. No. 957,882, Oct. 7, 1992, abandoned, which is a continuation-in-part of Ser. No. 921,460, Jul. 28, 1992, abandoned, which is a continuation-in-part of Ser. No. 857,729, Mar. 26, 1992, abandoned, which is a continuation-in-part of Ser. No. 810,483, Dec. 19, 1991, abandoned.

[51] Int. Cl.[6] .............................. G02B 5/18; B44B 5/00; B29D 11/00
[52] U.S. Cl. .................. 359/567; 101/5; 101/22; 264/1.34; 283/86; 359/2; 359/573; 359/575
[58] Field of Search .................. 359/567, 2, 573, 359/575, 572; 264/1.3, 2–7, 284; 101/3.1, 4, 5, 22; 283/86

[56] References Cited

U.S. PATENT DOCUMENTS

| | | | |
|---|---|---|---|
| 2,481,757 | 9/1949 | Jungersen | 359/530 |
| 3,319,519 | 5/1967 | Shelanski | 359/489 |
| 3,515,459 | 6/1970 | Wood | 359/567 |
| 3,684,348 | 8/1972 | Rowland | 359/530 |
| 3,758,649 | 9/1973 | Frattarola | 359/3 |
| 3,882,207 | 5/1975 | Hannan et al. | 264/1.3 |
| 3,893,795 | 7/1975 | Nauta . | |
| 3,992,080 | 11/1976 | Rowland | 359/533 |
| 4,125,760 | 11/1978 | Nyfeller | 359/3 |
| 4,547,141 | 10/1985 | Ruschmann | 359/3 |
| 4,773,718 | 9/1988 | Weitzen et al. | 359/3 |
| 5,155,604 | 10/1992 | Miekka et al. | 359/567 |

*Primary Examiner*—Martin Lerner
*Attorney, Agent, or Firm*—John H. Crozier

[57] ABSTRACT

In a preferred embodiment, a method of producing embossed first and second elongate, edgewise side by side, repeating, optical patterns on a sheet for use in producing secure identification means, the method comprising: continuously embossing the first and second optical patterns on the sheet, such that the first and second patterns repeat at different rates, so that the first pattern will "walk" with respect to the second pattern.

2 Claims, 2 Drawing Sheets

METHOD OF EMBOSSING REPEATING PATTERNS ON A SUBSTRATE, THE PATTERNS HAVING DIFFERENT RATES OF REPETITION

CROSS-REFERENCE TO RELATED APPLICATIONS

This is a continuation of application Ser. No. 07/962,934 filed on Oct. 19, 1992 now abandoned which is a continuation-in-part of U.S. application Ser. No. 07/957,882, filed by me Oct. 7, 1992, abandoned, and titled METHOD AND APPARATUS FOR MANUFACTURE OF DIFFRACTION GRATINGS FOR IDENTIFICATION MEANS, which is a continuation-in-part of U.S. application Ser. No. 07/921,460, filed Jul. 28, 1992, now abandoned, which is a continuation-in-part of U.S. application Ser. No. 07/857,729, filed Mar. 26, 1992, abandoned, which is a continuation-in-part of U.S. application Ser. No. 07/810,483, filed Dec. 19, 1991, abandoned.

BACKGROUND OF THE INVENTION

1. Field of the Invention.

The present invention relates to identification means generally and, more particularly, but not by way of limitation, to a novel method and apparatus for manufacturing diffraction gratings for use in secure identification means.

2. Background Art

In the immediate parent of the present application, the need for providing variability in optical images employed in secure identification means such as credit cards is discussed. That application describes some methods and apparatus for increasing the variability of optical images over conventional methods and apparatuses.

In such methods, a longitudinal embossed sheet is produced which has side by side unique repeating optical patterns. The methods described include varying the unique optical patterns; however, the side by side patterns have a locked relationship. That is, a particular pattern at a given point is always adjacent a specific other pattern whenever the first particular pattern appears.

It is a principal object of the present invention to provide an additional method and apparatus for increasing the variability of optical images employed in secure identification means.

It is a further object of the invention to provide such method and apparatus that is easily and economically implemented.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a method of producing embossed first and second elongate, edgewise side by side, repeating, optical patterns on a sheet for use in producing secure identification means, said method comprising: continuously embossing said first and second optical patterns on said sheet, such that said first and second patterns repeat at different rates, so that said first pattern will "walk" with respect to said second pattern.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
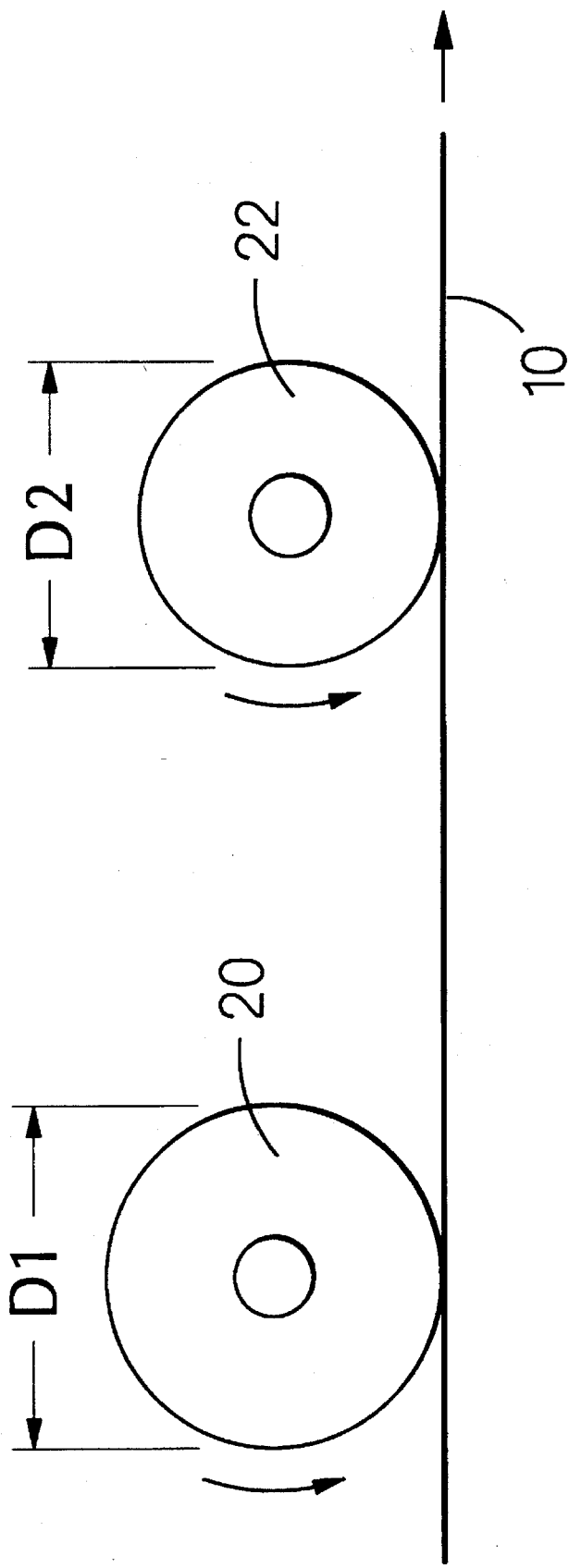
FIG. 1 is a schematic, side elevational view of embossing apparatus according to the present invention.

Reference should now be made to the drawing figures which illustrate the method and apparatus of the present invention.

FIG. 1 illustrates apparatus for embossing a sheet 10, which sheet may be a metal foil or a wax layer which will be subsequently metallized by vapor deposition of, for example, chromium, aluminum, or nickel, as is known in the art. Rather than employing a single embossing roll, as in conventional embossing methods, the present invention provides two embossing rolls 20 and 22 rotatably disposed so as to emboss sheet 10 in known manner. It is to be noted that the diameter, D1, of embossing roll 20 is greater than the diameter, D2, of embossing roll 22. It will be understood that embossing roll 22 will necessarily rotate at a rate D1/D2 times the rate of rotation of embossing roll 20. It will also be understood that the patterns embossed by embossing rolls 20 and 22 will repeat each complete revolution of the embossing rolls.

Figure 2:
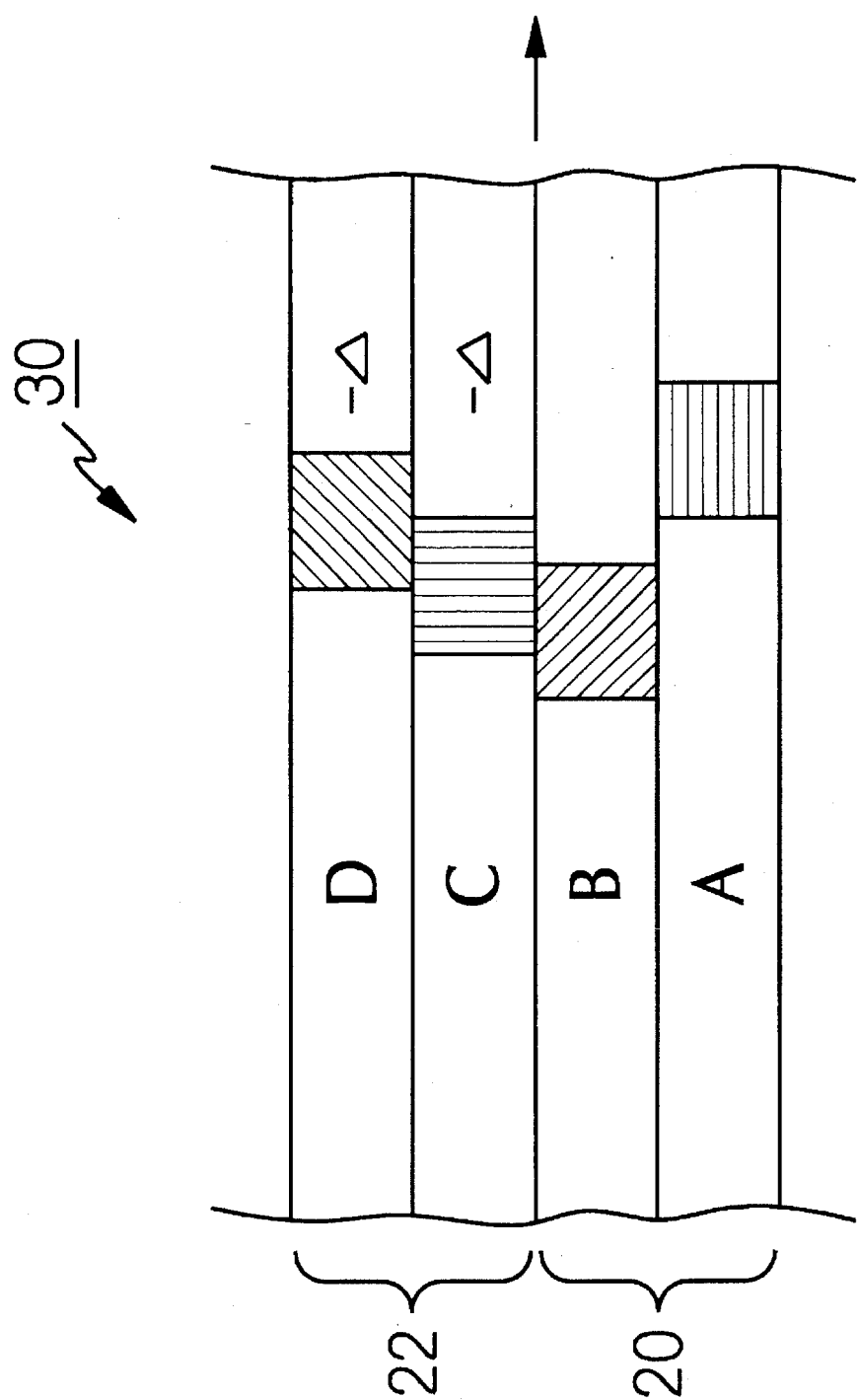
FIG. 2 is a top plan view of an embossed sheet according to the present invention..

Referring also now to FIG. 2, there is illustrated a portion of an embossed sheet produced by the apparatus of FIG. 1, generally indicated by the reference numeral 30. Sheet 30 includes edgewise side by side unique patterns A, B, C, and D indicated by a single diffraction grating element shown on each. Patterns A and B have been embossed by embossing roll 20, while strips C and D have been embossed by embossing roll 22. The consequence of this is that patterns C and D will "walk" relative to the patterns A and B each revolution of embossing roll 20 by a decrement, delta, equal to the difference in circumferences of embossing rolls 20 and 22. When the patterns are made up of diffraction grating segments, as shown, it is preferable that the decrement be equal to the width of the minimum size segment for improved reading of the final identification means product.

The above arrangement provides increased variability when two strips are employed for a secure identification means. This is accomplished by subsequently slitting sheet 30 so that either patterns A and C or patterns B and D will be read by a dual detector reader as is described in the above-referenced applications.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A method of producing embossed first and second elongate, parallel, repeating, patterns of optical elements on a sheet for use in producing secure identification means, said method comprising:

(a) continuously embossing a first said pattern on a first side of said sheet, with a first embossing roll of a first circumference; and (b) continuously embossing a second said pattern on said first side of said sheet, parallel to said first pattern, with a second embossing roll of a second circumference different from said first circumference;

whereby, said first and second patterns repeat at different rates such that each embossing of said first and second patterns causes said first and second patterns to be offset lengthwise, relative to an immediately preceding embossing of said patterns, by an increment equal to the difference in circumferences between said first and second embossing rolls.

2. A method, as defined in claim 1, further comprising: providing said first and second circumferences differing in length by the width of a minimum width said optical element.

* * * * *